(12) United States Patent
Haraguchi et al.

(10) Patent No.: US 8,040,440 B2
(45) Date of Patent: Oct. 18, 2011

(54) PROJECTION DEVICE AND PROJECTION METHOD

(75) Inventors: Takatoshi Haraguchi, Higashiyamato (JP); Takashi Kokubo, Akishima (JP); Hideo Hamanaka, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 1319 days.

(21) Appl. No.: 11/650,809

(22) Filed: Jan. 8, 2007

(65) Prior Publication Data
US 2007/0171313 A1 Jul. 26, 2007

(30) Foreign Application Priority Data

Jan. 11, 2006 (JP) ................................ 2006-004045

(51) Int. Cl.
*H04N 9/12* (2006.01)
(52) U.S. Cl. ......... 348/743; 348/742; 348/744; 348/273
(58) Field of Classification Search .......... 348/742–744, 348/771, 745, 806, 268–270, 273; 353/30, 353/84, 94, 31; *H04N 9/12, 9/31*
See application file for complete search history.

(56) References Cited

U.S. PATENT DOCUMENTS

| | | | |
|---|---|---|---|
| 6,400,511 B2 * | 6/2002 | Vanlier et al. | 359/634 |
| 6,520,648 B2 * | 2/2003 | Stark et al. | 353/85 |
| 6,984,040 B2 | 1/2006 | Childers | |
| 2001/0022692 A1 | 9/2001 | Vanlier et al. | |
| 2006/0023304 A1 | 2/2006 | Mönch et al. | |
| 2006/0050246 A1 | 3/2006 | Moench et al. | |
| 2007/0030401 A1 | 2/2007 | Chien et al. | |

FOREIGN PATENT DOCUMENTS

| | | |
|---|---|---|
| EP | 1 672 932 A1 | 6/2006 |
| JP | 08-505031 T | 5/1996 |
| JP | 2003-077689 A | 3/2003 |
| JP | 2003-162001 A | 6/2003 |
| JP | 2003-169346 A | 6/2003 |
| JP | 2004-191685 A | 7/2004 |
| JP | 2005-038815 A | 2/2005 |
| JP | 2006-515077 T | 5/2006 |
| JP | 2006-227440 A | 8/2006 |
| TW | 515208 | 12/2002 |
| TW | I259931 B | 8/2006 |
| WO | WO 2004/030372 A1 | 4/2004 |
| WO | WO 2004/064409 A1 | 7/2004 |
| WO | WO 2006/056926 A1 | 6/2006 |

(Continued)

OTHER PUBLICATIONS

International Search Report and Written Opinion dated May 31, 2007, issued in International Application No. PCT/JP2007/050539 filed Jan. 10, 2007, 11 sheets. Chinese Office Action dated Dec. 11, 2009 and English translation thereof issued in a counterpart Chinese Application No. 2007800019608.
Taiwanese Office Action dated Jan. 20, 1010 and English translation thereof issued in a counterpart Taiwanese Application No. 096100907.
Japanese Office Action dated Jun. 8, 2010 and English translation thereof, issued in counterpart Japanese Application No. 2006-004045.

* cited by examiner

*Primary Examiner* — Trang U Tran
(74) *Attorney, Agent, or Firm* — Holtz, Holtz, Goodman & Chick, P.C.

(57) ABSTRACT

A projection device comprises a light source, a color wheel which is inserted into an optical path of the light source and in which a plurality of color segments are formed along a peripheral direction of the color wheel. The color segments are configured to transmit a plurality of wavelength band components in the white light in a time division manner during a rotation of the color wheel. A light source driving unit alternating-current discharges the light source at a period shorter than a rotation period of the color wheel while reverses a polarity at a timing to switch the segment of the color wheel inserted into the optical path.

13 Claims, 3 Drawing Sheets

PROJECTION DEVICE AND PROJECTION METHOD

CROSS-REFERENCE TO RELATED APPLICATIONS

This application is based upon and claims the benefit of priority from prior Japanese Patent Application No. 2006-004045, filed Jan. 11, 2006, the entire contents of which are incorporated herein by reference.

BACKGROUND OF THE INVENTION

1. Field of the Invention

The present invention relates to a projection device and a projection method capable of forming an image of primary color components in a time division manner by use of a white light source and a color wheel to thereby project a color image.

2. Description of the Related Art

In a projection device of a digital light processing (DLP) (registered trademark) system, each primary color component of light from a white light source is transmitted in a time division manner via a member which is referred to as a color wheel and which is provided with at least primary color filters of red (R), green (G) and blue (B), and the primary color light is successively reflected in the time division manner by an optical modulation element for displaying a monochromatic image. In consequence, an optical image is formed and projected, whereby a color image is projected and displayed.

In this type of projection device, a high-pressure mercury vapor lamp which performs arc discharge is used as the white light source, and the mercury vapor lamp is driven with an alternating current. A rotation frequency of the color wheel is set to be integer times as much as a driving frequency of the white light source.

FIG. 4 illustrates a constitution of a general color wheel 1. In the drawing, an arrow r indicates a rotating direction. Here, the wheel 1 employs a constitution of four segments in total in which a white (W) (practically transparent) segment is disposed in addition to the red (R), green (G) and blue (B) segments.

Rotation driving of the color wheel 1 is synchronized with a frame frequency of an image to be projected, and it is set to 50 (PAL)/60 (NTSC) [Hz] in many cases.

Driving (discharge) of the lamp which is the light source causes a problem such as flicker of the image, if the driving of the lamp is not synchronized with this frame frequency of the image. Therefore, the general light source lamp is always driven at 50/60 [Hz].

FIG. 5 shows a driving timing of the general color wheel in response to a driving period of the light source lamp. In this drawing, the frequency of the light source lamp is set to 60 [Hz]. On the contrary, a case where the driving frequency of the color wheel 1 is doubled to 120 [Hz] will be exemplified.

During a first half, i.e., 1/120 [sec], of one period (=1/60 [sec]) of driving of the lamp, the light source lamp is driven with one polarity, for example, a plus (+) polarity. In synchronization with this, the segments R, G, B and W of the color wheel 1 are inserted into an optical path in this order.

Afterward, during a latter half, i.e., 1/120 [sec], the light source lamp is driven with the other polarity, for example, a minus (−) polarity. In synchronization with this, the segments R, G, B and W of the color wheel are similarly inserted into the optical path in this order.

Thus, it is appropriate to set the rotation frequency of the color wheel to be integer times as much as the driving frequency of the lamp. On the other hand, to realize a brighter projected image, a lamp having a high emission luminance is demanded.

However, the driving frequency of the lamp depends on a structure and a performance of the lamp. In a case where a structure having the high emission luminance is simply employed, there is a possibility that the lamp is required to be driven at a frequency which deviates from the synchronization frequency.

However, when the lamp is driven outside a synchronization frequency (e.g., 50/60 [Hz]), there occurs a large problem of image quality such as the flicker as described above. As a result, even if such a lamp has the high emission luminance, the lamp cannot be employed in a projector of the DLP system.

Moreover, another technology has been considered in which the driving frequency of the lamp is set to be, for example, 0.75 time as much as the rotation frequency of the color wheel. As understood from the above, the rotation frequency of the color wheel is not necessarily set to be integer times as much as the driving frequency of the lamp (e.g., Jpn. Pat. Appln. KOKAI Publication No. 2003-162001).

However, even in the technology described in the patent document, a period of each segment of the color wheel (an occupying angle of each segment on the color wheel) is influenced by the driving frequency of the lamp. Therefore, the period of each segment of the color wheel cannot arbitrarily be set.

BRIEF SUMMARY OF THE INVENTION

According to an embodiment of the present invention, a projection device comprises a light source which emits white light by alternating-current discharge, a color wheel which is inserted into an optical path of the light source and in which a plurality of color segments are formed at arbitrary sector angles along a peripheral direction of the color wheel, the color segments being configured to transmit a plurality of wavelength band components in the white light in a time division manner by rotating the color wheel, a color wheel driving unit which rotates the color wheel at a constant speed, and a light source driving unit which alternating-current discharges the light source at a period shorter than a rotation period of the color wheel while reversing a polarity at a timing to switch the segment of the color wheel inserted into the optical path.

According to another embodiment of the present invention, a projection method of a projection device comprising a light source which emits white light by alternating-current discharge, and a color wheel which is inserted into an optical path of the light source and in which a plurality of color segments are formed at arbitrary sector angles along a peripheral direction of the color wheel, the color segments being configured to transmit a plurality of wavelength band components in the white light in a time division manner by rotating the color wheel, the method comprises:

alternating-current discharging the light source at a period shorter than a rotation period of the color wheel while reversing a polarity at a timing to switch the segment of the color wheel inserted into the optical path.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of a projection device and a projection method according to the present invention will now be described with reference to the accompanying drawings. In the following description, the present invention is applied to a data projection device 10 of a digital light processing (DLP)® system.

Figure 1:
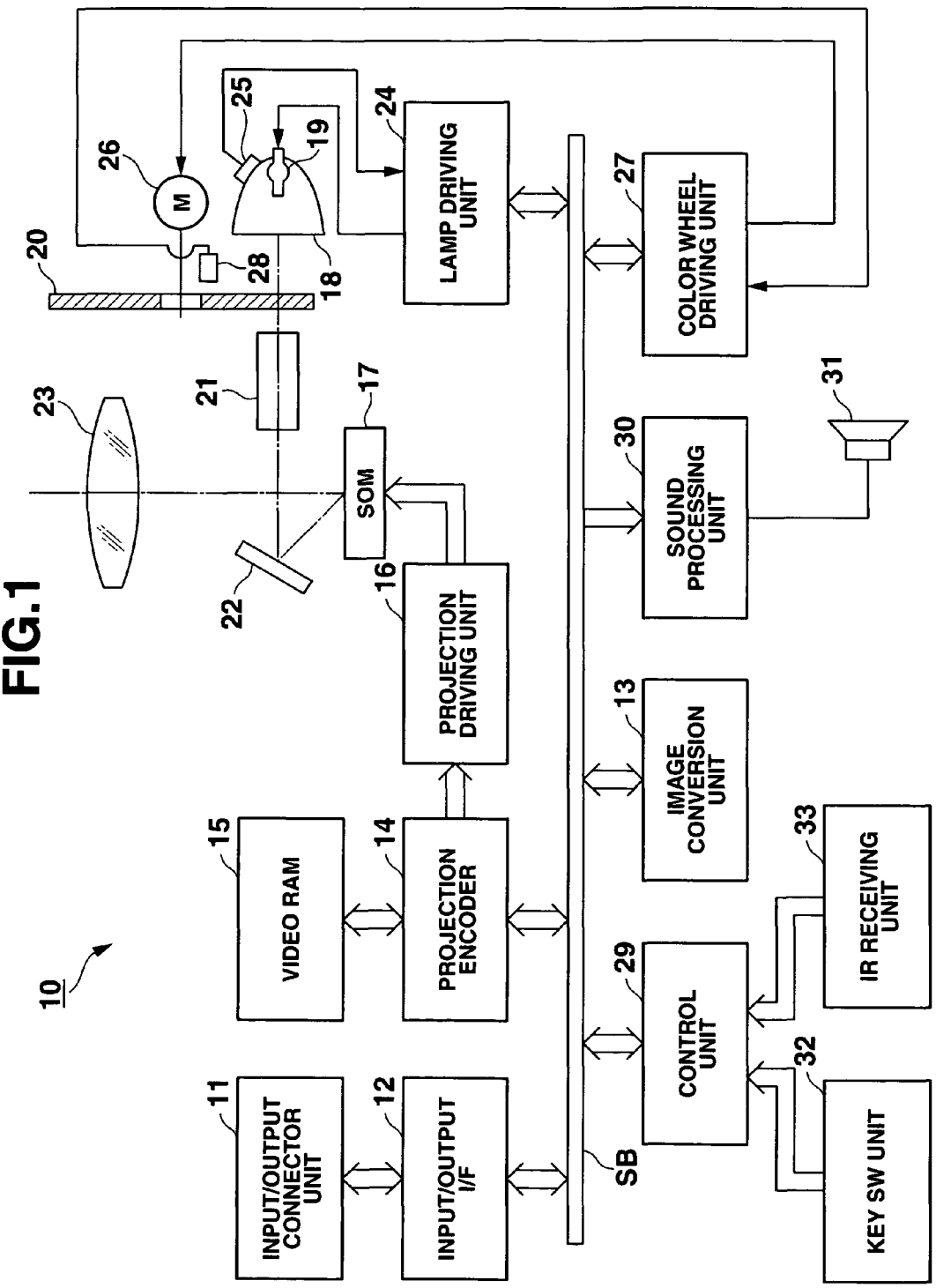
FIG. 1 is a block diagram showing a circuit constitution of a data projection device according to an embodiment of the present invention.

FIG. 1 shows a circuit constitution of the data projection device 10 according to the present embodiment. An image signal of various standards which is input from an input/output connector unit 11 is supplied to an image conversion unit 13 via an input/output interface (I/F) 12 and a system bus SB, and converted into an image signal having a predetermined format. The converted signal is supplied to a projection encoder 14.

The projection encoder 14 develops and stores the supplied image signal in a video RAM 15, generates a video signal from the image signal stored in the video RAM 15, and then outputs the video signal to a projection driving unit 16.

In response to the supplied image signal, the projection driving unit 16 appropriately drives in a high speed time division manner a micro mirror element 17 which is, for example, a spatial optical modulation element (SOM). The driving frequency is based on a product of a frame rate of, for example, 120 [frames/second], the number of the divided color components, and the number of display gradations.

A light source lamp 19 constituted of, for example, a high-pressure mercury-vapor lamp disposed in a reflector 18 emits white light having a high luminance, and primary color components of the white light are appropriately selectively transmitted through a color wheel 20. Then, luminance distributions of the primary color components are homogenized in a light tunnel 21, and the primary color components are totally reflected by a mirror 22 and applied to the micro mirror element 17. In consequence, an optical image is formed with the reflected lights, and the image is projected and displayed on a screen (not shown herein) via a projection lens 23.

The lighting of the light source lamp 19 is controlled by a lamp driving unit 24, and a detection output of a temperature sensor 25 disposed in the vicinity of the light source lamp 19 of the reflector 18 is also supplied to the lamp driving unit 24, and converted into a digital signal therein.

A motor (M) 26 which rotates the color wheel 20 rotates at a constant speed in accordance with a voltage supplied from a color wheel driving unit 27. Rotating positions of the color wheel 20, specifically, switch positions which are boundaries between the segments of red (R), green (G), blue (B) and white (W) are detected by a position sensor 28, and the resultant detection output is supplied to the color wheel driving unit 27 and digitized therein.

All operations of the above circuits are controlled by a control unit 29. The control unit 29 is constituted of a CPU, a nonvolatile memory which stores an operation program to be executed by the CPU during a projecting operation, a work memory and the like.

The control unit 29 is also connected to a sound processing unit 30 via the system bus SB.

The sound processing unit 30 includes a sound source circuit for a PCM sound source or the like. The sound processing unit 30 converts sound data given during the projecting operation into analog data, and drives a speaker 31 to amplify and emit sound or generate beep sound or the like if necessary.

In the data projection device 10, each key operation signal in a key switch (SW) unit 32 disposed on an upper surface of a housing of the data projection device 10 is directly input into the control unit 29. Moreover, a signal from an Ir receiving unit 33 is also directly input into the control unit 29.

The Ir receiving unit 33 receives an operation signal from a remote controller (not shown) attached to the data projection device 10 or an infrared modulation signal which meets the IrDA standard from an external apparatus via Ir receiving window portions arranged in a front surface and a rear surface of the housing of the data projection device 10, respectively. Then, the Ir receiving unit 33 converts the received signal into a code signal to send the signal to the control unit 29.

Next, an operation of the above embodiment will be described.

In the data projection device 10, the driving of the light source lamp 19 is controlled in two stages of a usual light emission time and a low-luminance light emission time. That is, at the usual light emission time, a rated voltage is applied to the light source lamp 19 to drive the lamp, and a cooling operation by a cooling fan or the like (not shown in FIG. 1) is also executed on rated conditions. On the other hand, at the low-luminance light emission time, a predetermined voltage, which is lower than the rated voltage and does not adversely affect a life and the like of the lamp, is applied to the light source lamp 19 to drive the lamp. The cooling operation by the cooling fan or the like is executed on conditions lower than the rated conditions in accordance with a lower heating value due to the lower light emission luminance. In consequence, the whole power consumption and generation of noise are reduced.

Figure 4:
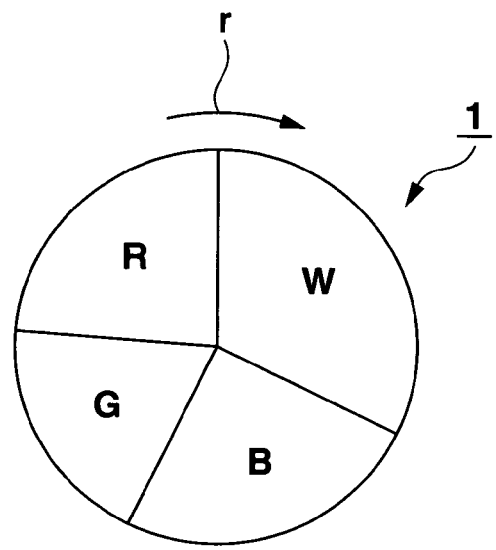
FIG. 4 is a diagram illustrating a constitution of a general color wheel.
Figure 5:
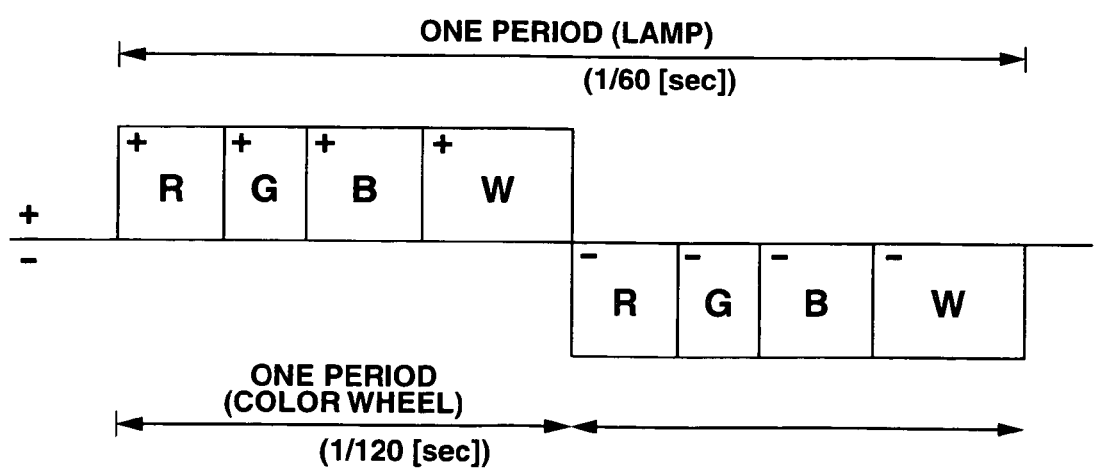
FIG. 5 is a diagram showing a driving timing of the general color wheel in response to a driving period of a light source lamp.

The color wheel 20 has four segments of, for example, red (R), green (G), blue (B) and white (W). In consideration of a wavelength band characteristic and a color balance of a filter for use in each segment as in the color wheel 1 shown in FIG. 4, sector angles of sector-shaped segments R, G, B and W are arbitrarily set so that the sector angles differ from one another and a sum of the angles is 360 degrees.

Figure 2:
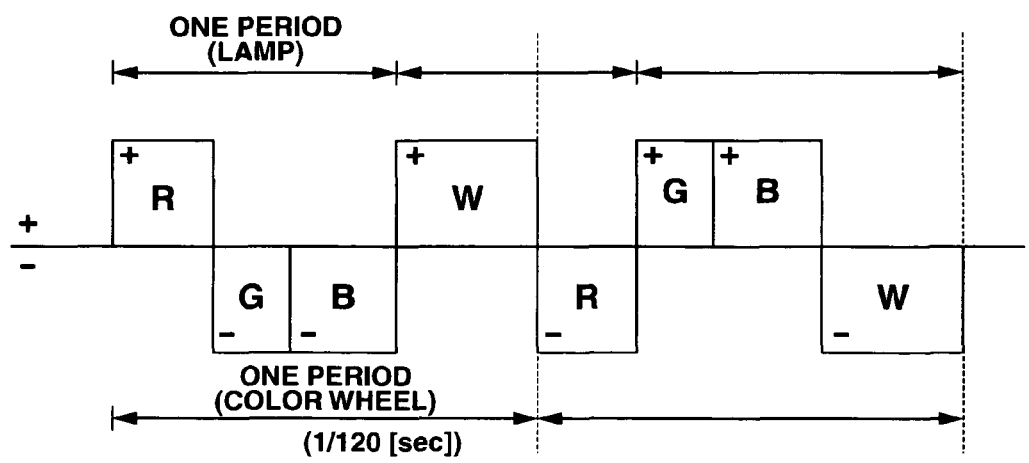
FIG. 2 is a diagram showing a driving timing of a color wheel in response to a driving period of a light source lamp in the embodiment.

FIG. 2 illustrates a light emission driving period of the light source lamp 19 and a color wheel driving timing of the color wheel 20 at the usual light emission time.

As shown in FIG. 2, the color wheel 20 is rotated at a constant speed, and a rotation period of the wheel 20 is fixed at, for example, 1/120 [sec]. On the other hand, the light source lamp 19 is driven with reversing a polarity in synchronization with a timing to switch each segment of the color wheel 20 inserted into an optical path under controls of the control unit 29 and the lamp driving unit 24.

In the following, during alternating-current driving of the light source lamp 19, one driving direction of the lamp is referred to as plus, and the other driving direction obtained by reversing a polarity is referred to as minus.

Specifically, during the first rotation period of the color wheel 20, and while the segment R of the color wheel 20 is inserted into the optical path, the light source lamp 19 is driven with the polarity of the plus direction. Subsequently, while the segments G, B are inserted into the optical path, the lamp is driven with the reversed polarity of the minus direction.

While the segment W is inserted into the optical path, the light source lamp 19 is driven with the polarity of the plus direction. Subsequently, during the second rotation period, and while the segment R is inserted into the optical path, the lamp is driven with the reversed polarity of the minus direction.

While the segments G, B are inserted into the optical path, the light source lamp 19 is driven with the polarity of the plus direction. Subsequently, while the segment W is inserted into the optical path, the lamp is driven with the reversed polarity of the minus direction.

As understood from the above, the period during which the color wheel 20 rotates twice is regarded as one driving pattern cycle, and the polarity reverse timing of the driving of the light source lamp 19 is synchronized with the timing to switch the segment of the color wheel 20.

This is realized in the following manner. The position sensor 28 detects a rotating position of the color wheel 20, and the color wheel driving unit 27 digitizes the resultant detection signal and supplies the digitized signal to the control unit 29. Then, the control unit 29 supplies, to the lamp driving unit 24, a driving signal for switching the segment in accordance with the arbitrarily set sector angle of each segment of the color wheel 20, and in response to this driving signal, the lamp driving unit 24 lights the light source lamp 19 to control the polarity reverse timing of the lamp.

As described above, the period during which the color wheel 20 rotates twice is regarded as one driving pattern cycle, and the polarity reverse timing of the driving of the light source lamp 19 is synchronized with the timing to switch the segment of the color wheel 20. In one driving pattern cycle, the driving of the lamp 19 is controlled so as to include three periods.

Figure 3:
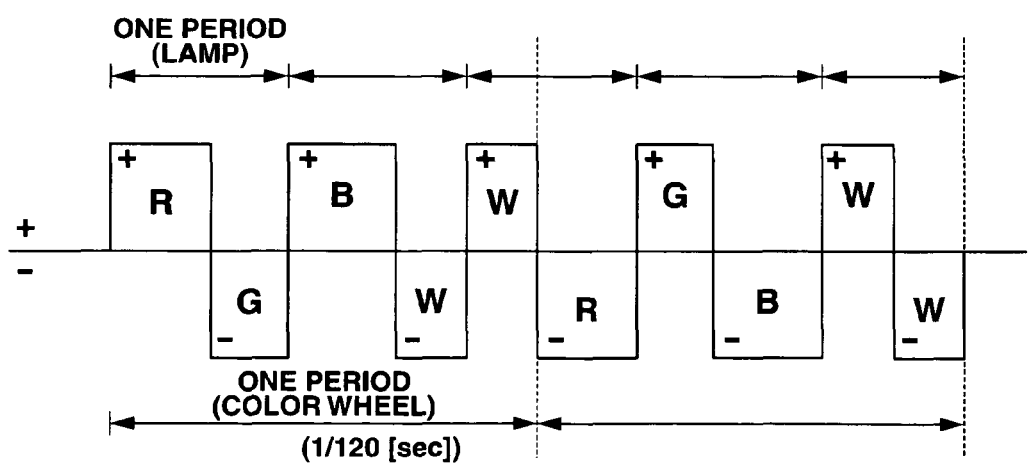
FIG. 3 is a diagram showing a driving timing of a color wheel in response to a driving period of a light source lamp in a low-luminance emission mode in the embodiment.

FIG. 3 illustrates a light emission driving period of the light source lamp 19 and a color wheel driving timing of the color wheel 20 at the low-luminance light emission time.

As shown in FIG. 3, the color wheel 20 is rotated at the constant speed similar to that of the usual light emission time, and the rotation period of the color wheel 20 is fixed at, for example, 1/120 [sec]. On the other hand, the light source lamp 19 is driven with reversing a polarity in synchronization with the timing to switch the segment of the color wheel 20 inserted into the optical path under the controls of the control unit 29 and the lamp driving unit 24.

Specifically, during the first rotation period of the color wheel 20, and while the segment R of the color wheel 20 is inserted into the optical path, the light source lamp 19 is driven with the polarity of the plus direction. Subsequently, while the segment G is inserted into the optical path, the lamp 19 is driven with the reversed polarity of the minus direction.

Next, while the segment B is inserted into the optical path, the light source lamp 19 is driven with the polarity of the plus direction. Subsequently, during the first half of a time when the segment W is inserted into the optical path, the lamp 19 is driven with the reversed polarity of the minus direction.

During a latter half of the time when the segment W is inserted into the optical path, the light source lamp 19 is driven with the polarity of the plus direction. Subsequently, during the second rotation period, and while the segment R is inserted into the optical path, the lamp 19 is driven with the reversed polarity of the minus direction.

While the segment G is inserted into the optical path, the light source lamp 19 is driven with the polarity of the plus direction. Subsequently, while the segment B is inserted into the optical path, the lamp 19 is driven with the reversed polarity of the minus direction.

Subsequently, during the first half of a time when the segment W is inserted into the optical path, the light source lamp 19 is driven with the polarity of the plus direction. During a latter half of the time when the segment W is inserted into the optical path, the lamp 19 is driven with the reversed polarity of the minus direction.

As understood from the above, the period during which the color wheel 20 rotates twice is regarded as one driving pattern cycle, and the polarity reverse timing of the driving of the light source lamp 19 is synchronized with the timing to switch the segment of the color wheel 20. In one driving pattern cycle, the driving of the lamp 19 is controlled so as to include five periods.

As described above, the electric discharge period (light emission period) of the lamp 19 in the usual light emission time is not equal to that in the low-luminance light emission time, and the lamp 19 is driven with reversing a polarity in synchronization with the timing to switch the segment of the color wheel 20 inserted into the optical path.

Therefore, the number of electric discharge times (light emission times) of the light source lamp 19 per unit time can be increased in accordance with setting of time widths (the sector angles) of the respective segments constituting the color wheel 20. Accordingly, a temperature control of the light source lamp 19 is very easy.

Moreover, since the light source lamp 19 is synchronously driven so as to alternately reverse the polarity of the light source lamp 19 during the insertion of the segment into the optical path in consideration of the time widths of the plurality of color segments R, G, B and W constituting the color wheel 20, the occurrence of the flicker, color drift and the like can be prevented.

Furthermore, at the low-luminance light emission time of the light source lamp 19, the time period when the segment W is inserted into the optical path is divided into two sub periods, and the light source lamp 19 is driven so that the polarity of the light source lamp 19 is reversed in synchronism with the sub periods.

Therefore, even at the low-luminance light emission time at a low driving voltage of the light source lamp 19, the number of the electric discharge times of the light source lamp 19 is increased to thereby prevent a temperature of a terminal electrode of the lamp 19 from lowering below an allowable range, without adversely influencing a balance of the color components or the like. A possible range of the temperature control is can further be broadened to previously prevent a life of the light source lamp 19 from shortening.

It is to be noted that in the above embodiment, it has been described that the light source lamp 19 is constituted of the high-pressure mercury vapor lamp, but the present invention is not limited to this embodiment. The present invention can similarly employ another lamp such as a super high-pressure mercury vapor lamp having a higher pressure in a lamp tube, as long as the lamp is of an electric discharge type which emits the light while reversing the polarity by the alternating-current driving.

In addition, the present invention is not limited to the above embodiment, and can variously be modified within the scope of the present invention.

Furthermore, the above embodiment includes various stages of inventions, and a plurality of disclosed constitutional requirements can appropriately be combined, so that various inventions can be extracted. For example, even in a case where some constitutional requirements are removed from all the constitutional requirements described in the embodiment, the constitution from which the constitutional requirement has been removed can be extracted as the invention, so long as at least one of the problems described in the paragraph of the problem to be solved by the invention can be solved and at least one of the effects described in the paragraph of the effect of the present invention is obtained.

What is claimed is:

1. A projection device comprising:
   a light source which emits white light by alternating-current discharge;
   a color wheel which is inserted into an optical path of the light source and in which a plurality of color segments are formed at arbitrary sector angles along a peripheral direction of the color wheel, the color segments being configured to transmit a plurality of wavelength band components in the white light in a time division manner by rotating the color wheel;
   a color wheel driving unit which rotates the color wheel at a constant speed; and
   a light source driving unit which alternating-current discharges the light source at a period shorter than a rotation period of the color wheel while reversing a polarity at a timing to switch the segment of the color wheel inserted into the optical path;
   wherein a period of operation of the light source driving unit includes one of a first period where two color segments of the plurality of color segments constituting the color wheel are inserted into the optical path and a second period where three color segments thereof are inserted into the optical path, during one period of the alternating-current discharge of the light source.

2. The projection device according to claim 1, wherein the light source driving unit drives the light source so as to alternately reverse the polarity of the light source while the plurality of color segments constituting the color wheel are inserted into the optical path.

3. The projection device according to claim 2,
   wherein the color wheel is provided with a transparent segment which transmits the white light from the light source as it is; and
   wherein the light source driving unit drives the light source so as to reverse the polarity of the light source while the transparent segment is inserted into the optical path.

4. A projection device comprising:
   a light source which emits white light by alternating-current discharge;
   a color wheel which is inserted into an optical path of the light source and in which a plurality of color segments are formed at arbitrary sector angles along a peripheral direction of the color wheel, the color segments being configured to transmit a plurality of wavelength band components in the white light in a time division manner by rotating the color wheel;
   a color wheel driving unit which rotates the color wheel at a constant speed; and
   a light source driving unit which alternating-current discharges the light source at a period shorter than a rotation period of the color wheel while reversing a polarity at a timing to switch the segment of the color wheel inserted into the optical path;
   wherein a period of operation of the light source driving unit includes a period where only one color segment of the plurality of color segments constituting the color wheel is inserted into the optical path during one period of the alternating-current discharge of the light source.

5. The projection device according to claim 4, wherein the light source driving unit drives the light source so as to alternately reverse the polarity of the light source while the plurality of color segments constituting the color wheel are inserted into the optical path.

6. The projection device according to claim 4,
   wherein the color wheel is provided with a transparent segment which transmits the white light from the light source as it is; and
   wherein the light source driving unit drives the light source so as to reverse the polarity of the light source while the transparent segment is inserted into the optical path.

7. A projection device comprising:
   a light source which emits white light by alternating-current discharge;
   a color wheel which is inserted into an optical path of the light source and in which a plurality of color segments are formed at arbitrary sector angles along a peripheral direction of the color wheel, the color segments being configured to transmit a plurality of wavelength band components in the white light in a time division manner by rotating the color wheel;
   a color wheel driving unit which rotates the color wheel at a constant speed; and
   a light source driving unit which alternating-current discharges the light source at a period shorter than a rotation period of the color wheel while reversing a polarity at a timing to switch the segment of the color wheel inserted into the optical path;
   wherein a period of operation of the light source driving unit includes one of a first period where one color segment of the plurality of color segments constituting the color wheel is inserted into the optical path and a second period where two different color segments of the plurality of color segments constituting the color wheel are inserted into the optical path, during one period of the alternating-current discharge of the light source.

8. The projection device according to claim 7, wherein a period of operation of the light source driving unit includes a period where a transparent segment of the plurality of color segments constituting the color wheel is inserted into the optical path, during one period of the alternating-current discharge lighting of the light source.

9. The projection device according to claim 7, wherein the light source driving unit drives the light source so as to alternately reverse the polarity of the light source while the plurality of color segments constituting the color wheel are inserted into the optical path.

10. The projection device according to claim 7,
    wherein the color wheel is provided with a transparent segment which transmits the white light from the light source as it is; and wherein the light source driving unit drives the light source so as to reverse the polarity of the light source while the transparent segment is inserted into the optical path.

11. A projection method of a projection device comprising a light source which emits white light by alternating-current discharge, and a color wheel which is inserted into an optical path of the light source and in which a plurality of color segments are formed at arbitrary sector angles along a peripheral direction of the color wheel, the color segments being configured to transmit a plurality of wavelength band components in the white light in a time division manner by rotating the color wheel, the method comprising:

alternating-current discharging the light source at a period shorter than a rotation period of the color wheel while reversing a polarity at a timing to switch the segment of the color wheel inserted into the optical path;

wherein the alternating-current discharging comprises one of a first alternating-current discharging where two color segments of the plurality of color segments constituting the color wheel are inserted into the optical path during one period of the alternating-current discharge of the light source and a second alternating-current discharging where three color segments thereof are inserted into the optical path during one period of the alternating-current discharge of the light source.

12. A projection method of a projection device comprising a light source which emits white light by alternating-current discharge, and a color wheel which is inserted into an optical path of the light source and in which a plurality of color segments are formed at arbitrary sector angles along a peripheral direction of the color wheel, the color segments being configured to transmit a plurality of wavelength band components in the white light in a time division manner by rotating the color wheel, the method comprising:

alternating-current discharging the light source at a period shorter than a rotation period of the color wheel while reversing a polarity at a timing to switch the segment of the color wheel inserted into the optical path;

wherein only one color segment of the plurality of color segments constituting the color wheel is inserted into the optical path during one period of the alternating-current discharge of the light source.

13. A projection method of a projection device comprising a light source which emits white light by alternating-current discharge, and a color wheel which is inserted into an optical path of the light source and in which a plurality of color segments are formed at arbitrary sector angles along a peripheral direction of the color wheel, the color segments being configured to transmit a plurality of wavelength band components in the white light in a time division manner by rotating the color wheel, the method comprising:

alternating-current discharging the light source at a period shorter than a rotation period of the color wheel while reversing a polarity at a timing to switch the segment of the color wheel inserted into the optical path;

wherein the alternating-current discharging comprises one of a first alternating-current discharging where one color segment of the plurality of color segments constituting the color wheel is inserted into the optical path during one period of the alternating-current discharge of the light source and a second alternating-current discharging where two different color segments of the plurality of color segments constituting the color wheel are inserted into the optical path, during one period of the alternating-current discharge of the light source.

* * * * *